June 26, 1973   F. A. DE GORIA   3,741,854

METHOD OF PREPARING A CELLUAR, URETHANE BACKED TUFTED RUG

Original Filed Oct. 12, 1966

INVENTOR.
FRANK A. DI GIOIA
BY Richard P. Crowley
ATTORNEY

United States Patent Office 3,741,854
Patented June 26, 1973

---

3,741,854
METHOD OF PREPARING A CELLULAR, URETHANE BACKED TUFTED RUG
Frank A. De Gioia, Dalton, Ga., assignor to General Latex and Chemical Corporation, Dalton, Ga.
Continuation of application Ser. No. 866,159, Oct. 13, 1969, which is a continuation of application Ser. No. 586,074, Oct. 12, 1966, both now abandoned. This application Nov. 10, 1970, Ser. No. 88,473
Int. Cl. D05c 15/04
U.S. Cl. 161—67                                      16 Claims

ABSTRACT OF THE DISCLOSURE

The invention comprises a method of preparing a cellular urethane laminate by bonding a cellular polyurethane sheet material to a backing sheet material, for example of natural or synthetic fibers, with a foamable carboxylated latex containing pendant carboxylic and sulfonic acid groups and an amino compound. The laminate is heated to a temperature sufficient to cure the carboxylated latex and collapse the foamed carboxylated latex.

---

Figure 1:
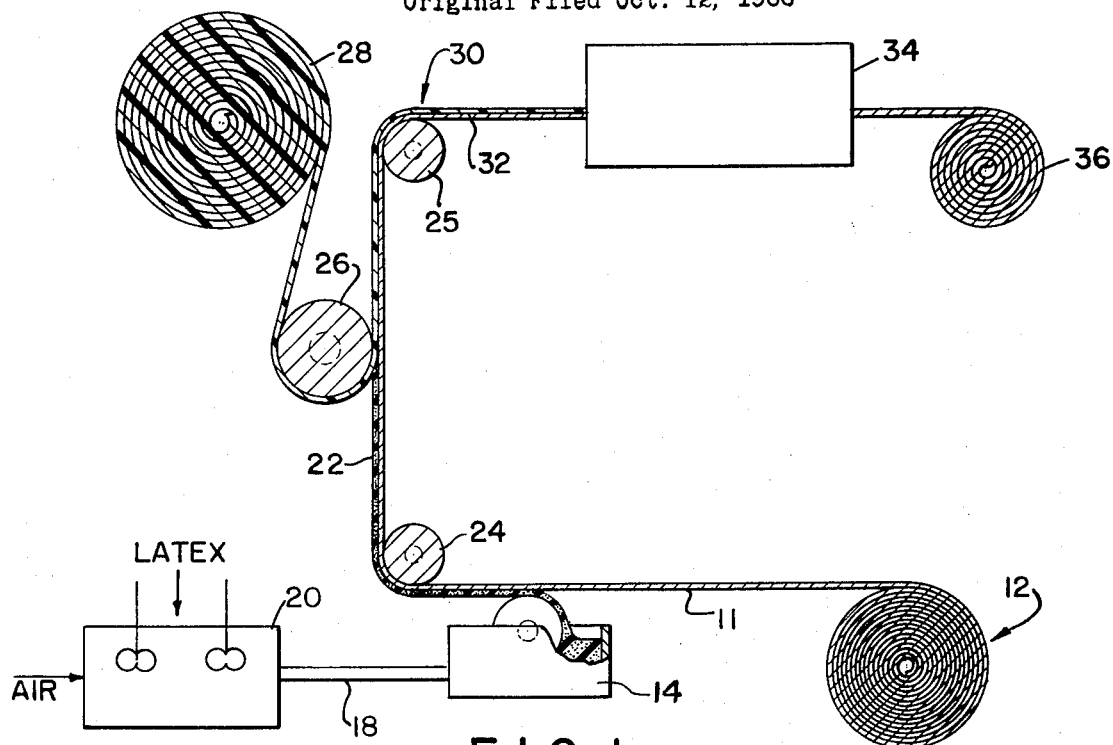

This application is a continuation of Ser. No. 866,159, filed Oct. 13, 1969, which application is a continuation of Ser. No. 586,074, filed Oct. 12, 1966, both now abandoned.

My invention concerns a method of preparing cellular-urethane backed, tufted rugs and other fabric cellular-urethane bonded laminates. In particular my invention relates to an improved method of laminating and bonding a thin sheet of a flexible, cellular polyurethane as a resilient backing material to a tufted rug.

The use of a sulfur-curing type natural or synthetic elastomer as a thin, adhesive film between fibrous sheet material to serve as a bonding agent particularly in tufted rugs and the like is well-known. Carboxylated styrene-butadiene latices have also been used as bonding agents. However, such materials and the method employed have been wholly unsatisfactory in providing good bonding characteristics between a flexible polyurethane, cellular foam sheet material and fibrous or fabric sheet materials. Some of the prior methods have employed a multi-component parts system with all the associate problems to the user regarding variations in the cure and gel requirements, the proper addition of component parts by the customer to prevent precure or cross-linking before bonding, and the waste occasioned by unusable, leftover material at the end of the working shift. In addition, some elastomers which require the presence of sulfur-containing curing agents or accelerators such as dithiocarbamates and some antioxidants tended to discolor certain yarns to which the urethane foam material is to be bonded. One prime disadvantage of prior tufted rugs has been the poor bonding strength obtained between the urethane foam backing and the fibrous material back of the rug, and which bonding strength often degraded further upon processing or use such as dyeing, washing or aging of the rug. There have been few or no low-density, cellular-urethane backed products commercially manufactured by the direct formation of a urethane foam on the fabric surface. The present commercial method of laminating a cellular-urethane sheet to a fabric is set forth, for example, in U.S. Pat. 2,957,793 wherein a surface of a urethane foam sheet to be laminated is melted to provide its own liquid adhesive for bonding to a fabric surface.

Accordingly, it is one object of my invention to provide a method of bonding a cellular-urethane sheet material to fabric or fibrous sheet material, and particularly the bonding of a thin, flexible urethane foam backing material to the back of a tufted rug, which laminate to the rug is characterized by high bond strength and improved washability and age-resistance of the bonding means.

Another object of my invention is to provide a simplified, inexpensive method of bonding a flexible urethane foam sheet material to a fibrous sheet material such as the preparation of a cellular-urethane backed, tufted rug, or a urethane foam to flat fabrics for use in personal clothing or decorative fabrics which method includes the use of a single component material, and the use of minimum quantities of the bonding material.

A further object of my invention is to provide a method of preparing a stain-resistant, washable, flexible urethane foam backed tufted rug, the method characterized by simplicity, low cost and faster running speeds than previous methods, and the rug characterized by a high adhesive, bonding strength between the rug back and the urethane foam.

An additional object of my invention is to provide a foamable carboxylated latex composition for use as adhesive to bond cellular-urethane sheets to a fiber backing material, which composition is stabilized against precure and ready for use without the addition of other components.

Figure 2:
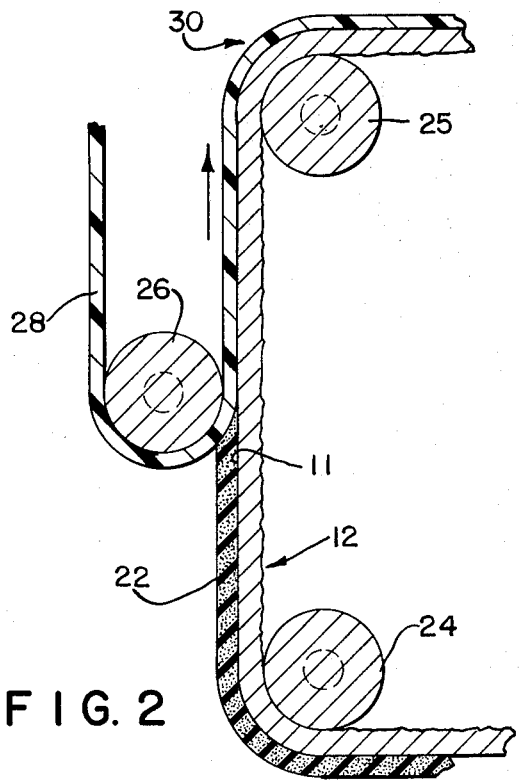

Other objects and advantages of my invention will be apparent to those persons skilled in the art from the following more detailed description of the invention taken in conjunction with the accompanying drawing, wherein:

FIG. 1 is a schematic illustration of a method of preparing a cellular-urethane backed, tufted rug by my process; and FIG. 2 is a fragmentary, enlarged section of FIG. 1 illustrating more particularly the contacting of the urethane foam sheet material to the back of the tufted rug.

Briefly, my invention comprises applying a thin, foamed layer of a stabilized natural or synthetic elastomer having pendant acid groups such as carboxylic groups to at least one surface of a cellular-urethane sheet or a fibrous sheet material, placing or pressing the foam-coated surface into a close contacting relationship with the opposite surface of the material to be bonded, so as to destroy substantially the intervening thin foam layer, and then heating the laminate so formed while said surfaces are in contact to cure and/or cross-link the carboxylated elastomer thereby providing excellent bonding between the contacting surfaces. In particular my method includes employing a carboxylated latex which contains an added compound capable of reacting with the acid or carboxylic groups of the elastomer, and a buffering agent to prevent precure or reaction of the components prior to heating, together with the necessary and desired fillers, thickeners, modifiers, dyes, pigments, stabilizers, and the like, whereby a simple, one-part, heat-curable, foamable, adhesive latex composition is obtained. This latex composition is then foamed by any conventional means, such as by the incorporation of air and mechanical agitation, and then applied as a thin, foamed layer on the back surface of a tufted rug such as by a roll coating technique. A thin backing sheet comprising a substantially open-cell, i.e., breathable, resilient, flexible polyurethane foam sheet is then pressed against the foam-coated back of the tufted rug so that the surface of the foam sheet comes into intimate contact with the foamed layer. Such contact or pressing together should destroy or substantially destroys the intervening foam layer. The intervening latex foam layer will be collapsed or of reduced thickness after such contact depending upon the degree of roughness and the nature of the substrates. The cellular backed rug is then heated in a conventional hot-air oven, radiant heater, or other means to a temperature sufficient to react the acid or carboxylic groups of the elastomer and the other reactive components therein to provide a cured, bonding adhesive between the cellular-urethane sheet and the back fibers of the tufted rug. In such a manner a simplified, inexpensive method of preparing a cellular backed, tufted rug with excellent bonding and other characteristics is obtained.

The use of heat-curing, foamable, carboxylated latices avoids many of the difficulties associated with prior art multi-component systems. For example, leftover material may be re-used and the user avoids the necessity of adding or compounding additional ingredients into the latex composition just prior to use or worrying about precuring or gelation prior to use or heating. Further, the carboxylated latices rather than being cured with conventional sulfur curing agents or accelerators, which may tend to discolor certain yarns, are cross-linked or reacted with other ingredients like basic aldehyde-amine resins such as melamine resins and are more resistant to discoloration and stain. In addition, the use of such foamable carboxylated latices and my method permits excellent and unexpected bonding results between the urethane foam sheet and a fibrous sheet material. The application of the carboxylated latices as a thin foam layer, which is subsequently substantially destroyed, is particuarly advantageous, since it permits the use of less of the bonding composition (carboxylated latex) and better control over the amounts used as a bonding adhesive, thereby reducing the cost of such material. The use of a thin foam layer permits the carboxylated latex to come into a close, penetrating and intimate relationship with the open cell surface of the urethane foam sheet and the fibrous backing sheet. The application of a carboxylated latice as a thin, non-foamed coating layer often requires excess material, which excess material may tend to penetrate and stain certain areas. Often such material is of such viscosity that it fails to penetrate sufficiently the small open cells on the surface of the urethane foam sheet with the result that bonding strength is reduced or the layer fails to cover the entire bonding surface. The use of a foamed layer, therefore, considerably enhances the ability of the carboxylated latice to provide good bonding strength, reduces staining, and enhances the surface contacting capabilities of the bonding composition.

My method is more particularly illustrated in the accompanying drawings wherein a tufted rug 12 has a woven backing fabric characterized on its back surface 11 by a plurality of raised, protruding back stitches of a fiber such as cotton, and face comprising a plurality of tufts. The rug 12 may have been back-coated with a highly loaded elastomeric composition to provide weight and stiffness to the rug. However, this back coating is not necessary as the foam penetrates only slightly so that strike-through is not usually a problem. In fact, the use of a back coating may be eliminated or reduced, since the carboxylated foam acts to lock in the tufts, while the urethane sheet provides additional bulk, cushioning and non-skid properties to the rug. The back surface 11 of the rug is passed over and into close coating contact with a coating roll disposed in pan 14 from which a foamed carboxylated latice layer 22 is applied onto the back surface 11.

One typical carboxylated latex single-component formulation which may be employed in my process is as follows:

| Ingredients | Parts in dry weight | Common range of parts in dry weight |
|---|---|---|
| 1. Carboxylated styrene-butadiene (50/50) latex (e.g., Southeastern Polymer Latex X515) | 100.0 | |
| 2. Trisodium polyphosphate (buffering agent) | 0.75 | 0.1-3.0 |
| 3. Melamine resin (reactive resin) (e.g., American Cyanamid CYREZ 933) | 0.80 | 0.1-10.0 |
| 4. Whiting (filler material) | 175.0 | 50-300 |
| 5. Sodium Polyacrylate (thickener) | 0.15 | |
| Total | 276.70 | |

This formulation is foamed in a conventional foaming machine 20 in which air and latex are mechanically agitated to produce an air-latex foam which is introduced through conduit 18 into pan 14 for application to the back surface 11 of rug 12. The foam typically has a density of 30 to 40 pounds per cubic foot of wet foam and is applied as a thin layer o about 3/32 of an inch to 1/8 or less in depth across substantially the entire back surface 11 of the rug 12. A thin sheet 28 of a synthetic plastic or resin sheet material, such as of a substantially open cell, flexible, resilient polyurethane foam material to be employed as a backing material is then pressed by tension against the thin foam layer 22, and the back surface 11 of the rug 12 by passing the urethane foam 28 and the coated rug 12 into contact. The foam sheet 28 is passed around a driven roller 26, and into contact with surface 11 of rug 12 supported by idler rollers 24 and 25. The contacting pressure is obtained primarily by tension so as to prevent excessive penetration of the foam 22 into the urethane foam 28, but sufficient to collapse the foam layer 22. As shown more particularly in FIG. 2 the intervening foam layer 22 is then destroyed and becomes a thin, non-foamable layer 32 in the urethane rug laminate 30. The laminate is then introduced through a hot-air type oven 34, maintained at about a temperature of from 300° F. to 325° F., wherein the melamine resin is reacted with a carboxylic group in the latex to provide a cured binding adhesive 32, thereby providing a cellular backed, tufted rug 36 of good bonding strength, and other desirable properties. The laminate 30 is cured at high temperature for a time sufficient to fully cure the latex composition such as for about 8 to 12 minutes in the example given.

With such typical carboxylated latex formula few precuring effects are noticed after storage periods of from 2 to 3 weeks so that leftover formulation material may be re-used and re-foamed. The amount and thickness of the foam layer 22 to be employed in my method may vary depending upon the amount of material to be used and the nature of the surface to be bonded. The thickness of the latex foam layer 22 for example, 1/16 and 1/2 an inch in thickness may vary inversely with the density of the foam. However, foam densities before collapse ranging from about 10 to 50 pounds may be employed.

My process has been described in particular with the use of thin polyurethane sheet material, which material may be obtained by cutting or slicing a urethane sheet to the desired thickness from a bun or roll of greater thickness. Presently flexible urethane foam is made through formation of slabs or "buns," frequently by "one shot" mechanisms, where all reactants are simultaneously metered to a small mixing chamber, discharged onto a moving conveyor, expanded and cured. These slabs or "buns" are then horizontally slit to give the sheet product, for example, 1/16" in thickness with 3/32" thickness most common. Another procedure used is to pour the urethane reactants into a cavity in the shape of a cylinder with the sheet product peeled off in a centrifugal peeler in a manner not dissimilar to methods of producing individual thicknessness from wooden logs for veneers. Instead of pouring into a cylindrical mold the bun may be fashioned or cut into rectangular sections, and then put through a "peeler." Both procedures of slitting and forming urethane sheets of the type used in my invention are described in the S.P.E.J., vol. 17, p. 1269 (1961). Joints in either event may be heat-sealed, so that rolls of slit foam may be of very substantial diameter, and with width of up to 12 feet.

Flexible polyester and polyether urethane foams of the type employed in furniture and clothing and which are useful in this invention are well-known (see U.S. Pat. 3,072,582). Such urethane foams are typically characterized as having a foam density of from about 1.4 to 1.8 pounds per cubic foot or greater, and are substantially open cellular in nature, consisting of essentially interconnecting cells to permit the passage of air or other gases, i.e., they are breathable. Open cellular or breathable-type urethane foams are desirable for use in connection with laminates prepared for use in contact with the human body, such as clothing inserts or liners, gloves and the like.

Although the preparation of the latex foam by mechanical agitation has been described, other means of obtaining the latex foam layer may be employed, such as the use in situ of various chemical blowing agents incorporated into the carboxylated latex compositions such as liquid halo carbon and compounds like fluoro carbons such as liquid Freons or chemical blowing agents which decompose upon the application of heat to generate of blowing gas.

The cellular urethane foam material may be applied to any woven or non-woven fibrous or fabric sheet material, which includes both natural and synthetic fibers, such as polyamides like nylon, rayon, cotton, wool, acrylates, poyyolefin fibers such as polyethylene and polypropylene, polyester fibers, rubber fibers, glass fibers, paper fibers, and the like, and blends thereof. For example, in the preparation of tufted rugs the woven backing material may comprise cotton, burlap, or inexpensive backing material of a woven nature, while the fibers tufted into the woven base may include nylon, rayon, cotton, acrylic fibers, polyesters and the like. My method is particularly adapted to the bonding of cellular urethane sheets to a tufted rug, since the back surface of the rug is characterized by a plurality of raised back stitches or projection which make the application of typical non-foamed, thin film bonding agents difficult, while carboxylated foam material readily penetrates both surfaces sufficiently to permit excellent bonding to be obtained. The use of a thin, collapsed latex foam layer also permits higher than normal production speeds to be maintained during the coating operation. The particular running speeds, the temperature of the oven, and the time of effecting the desired cure are subject to change depending upon the material or latex used and the results desired.

My process has been described in particular employing a carboxylated styrene-butadiene latex. However, various changes and modifications may be used in the formula. Typical carboxylated latices which may be employed are described, for example, in U.S. Pat. 3,215,647, issued Nov. 2, 1965, or U.S. Pat. 3,256,234, issued June 14, 1966, as well as the method of preparing foamed carboxylated latices. Any carboxylated latice which is subject to cure by a reactive resin or the like may be employed in my process which carboxylated latice composition is capable of being foamed. Many other uses for carboxylated latices are for non-frothed products, so that anti-foaming ingredients are usually incorporated in the latex during manufacture or added to a latex to prevent excessive frothing of the latex in use. My process requires a foamable latex so that the use of such antifoam additives should be avoided or the effectiveness of such agents reduced or destroyed prior to use in my process.

My single system carboxylated latex composition has been illustrated employing a conjugated diene copolymer like a 10 to 90 percent butadiene-styrene copolymer having pendant carboxylic groups such as acrylate capable of reacting with ingredients such as melamine resins, melamine-formaldehyde resins, urea-formaldehyde resins, urea, ammonia, or other amino or ammonium type compounds. However, any natural or synthetic elastomeric latex composition having pendant acid groups incorporated therein such as carboxylic or sulfonic groups may be used. The term "carboxylated" is used to include all such acid-type groups. Diene type polymers and copolymers which may be used include styrene-butadiene copolymers, diene-nitrile copolymers like butadiene-acrylonitrile copolymers, diene-acrylate copolymers like butadiene-alkyl acrylates and methacrylates, and diene-vinyl toluene, diene-vinyl pyridine, and the like. Acid groups are incorporated into these polymers by the use of acrylates, fumarates and the like.

My compositions are formulated with natural or synthetic water-soluble thickening agents such as polyvinylpyrrolidone, an acrylate like sodium, potassium or ammonium polyacrylate carboxymethyl cellulose, or other natural or synthetic water-soluble gels, polymers or resins usually in a small amount from about 0.05 to 5.0 percent by weight.

My carboxylated latice compositions are stabilized against pre-cure prior to heating by the addition of a buffering agent to change the pH to the alkaline side. The buffering agent should be added in an amount sufficient to prevent pre-reaction of the single system components within the desired length of time, and generally should adjust the pH of the latex composition in the range of from about pH 8.5 to pH 9.0. Fillers such as whiting, talc, diatomaceous earth may be used in the formulation as well as pigments like titanium dioxide, fibers like asbestos, glass, rubber and polymer particles, cork and other organic or inorganic fibrous or non-fibrous materials. Generally dyes, stabilizers, preservatives, dispersing agents, wetting agents, pigments, antioxidants, thickeners and other standard additives may also be employed. The amino compounds employed as reactive resins or agents in cross-linking the carboxylated latices are used in an amount sufficient to provide the desired cross-linking effects such as in amounts of from 0.01 to 10.0 percent by weight.

My process, thereby, provides a method of preparing a cellular-urethane fibrous laminate and avoids many of the difficulties associated with the prior art methods of preparing cellular urethane-fibrous laminates, and yet prepares a laminate having unexpectedly high bonding strength. As will be apparent to those persons skilled in the art, various modifications and changes in the formulations, amounts and procedures can be made in my method without departing from the spirit or scope of the disclosure or from the scope of the claims contained herein:

What I claim is:

1. The method of preparing a cellular urethane laminate which includes bonding one surface of a cellular polyurethane sheet material to a backing sheet material which method comprises:
    (a) applying a bonding amount of a thin foamed layer of a carboxylated latex onto at least one surface of one of the sheet materials, the carboxylated latex comprising a foamable carboxylated latex having pendant acid groups consisting of carboxylic and sulfonic acid groups and an amino compound capable of reacting with the acid groups of the latex;
    (b) contacting the opposing surface of said sheet materials under sufficient contacting pressure to collapse substantially the intervening foam carboxylic latex layer; and
    (c) heating the laminate so formed while the surfaces are in contact, to a temperature sufficient to cure the carboxylated latex thereby providing a cured carboxylated product as a bonding adhesive and a laminate product having excellent bond between the sheets.

2. The method of claim 1 wherein the urethane sheet material is a flexible, thin polyurethane sheet material and the backing sheet material is the back surface of a tufted rug.

3. The method of claim 1 wherein the latex foam layer is applied to the surface of the backing sheet material and the cellular urethane sheet material is pressed by tension pressure into contact with said foam coated surface.

4. The method of claim 1 wherein the latex foam layer is applied to the surface at a density of about 10 to 50 pounds per cubic foot of wet foam, and the foam layer is from about $\frac{1}{16}$ to $\frac{1}{2}$ an inch in thickness.

5. The method of claim 1 wherein the carboxylated latex is a carboxylated styrene butadiene copolymer and wherein the reactive compound to cross-link such carboxylated groups is selected from the group consisting of urea, urea-formaldehyde resin, melamine-urea resin, and a melamine-formaldehyde resin and combinations thereof.

6. The method of claim 5 wherein the carboxylated latex also includes a buffering agent in an amount sufficient to adjust the pH of the composition in the range of from about 8.5 to 9.0 and to prevent precure of the carboxylated latex.

7. The method of claim 1 which includes:
 (a) foaming a latex which comprises a carboxylated styrene-butadiene synthetic elastomer copolymer and an amino compound capable of reacting with the carboxylic groups of the styrene-butadiene elastomer and a buffering agent to prevent precure of the ingredients prior to heating;
 (b) applying a thin foam layer of the latex to the back surface of a tufted rug;
 (c) pressing one surface of a thin, flexible polyurethane cellular sheet material into intimate contact with the back surface of the tufted rug containing the foam layer to collapse the intervening foam latex layer; and
 (d) heating the laminate sheet material so formed while the surfaces are in contact, to a temperature sufficient to react the carboxylated styrene-butadiene elastomer with the amino compound to provide a cured carboxylated elastomeric reactant product as a heating adhesive.

8. A cellular-urethane bonded laminate produced by the method of claim 1.

9. The method of claim 1 in which the carboxylated latex comprises:
 (a) a synthetic elastomeric diene polymerizate latex containing pendant carboxylic groups from the polymerizate;
 (b) an amino compound capable of reacting with the carboxylic groups of the latex and in an amount to cure the latex; and
 (c) a buffering agent to adjust the pH of the latex to the alkaline side and inhibit pre-reaction of the ingredient; the latex substantially free of anti-foam ingredients which would prevent the foaming of the latex composition.

10. The method of claim 9 wherein the buffering agent adjusts the pH range of the latex to about 8.5 to 9.0.

11. The method of claim 9 wherein the latex comprises a butadiene-styrene rubbery copolymer latex and which latex includes additionally a water-soluble thickening agent.

12. The method of claim 1 wherein the cellular polyurethane sheet comprises a substantially open-cell breathable flexible sheet.

13. The method of claim 12 wherein the backing sheet comprises a sheet material of natural or synthetic fibers thereby providing a cellular fabric laminate suitable for use in contact with the human body.

14. A flexible open-cell cellular-urethane fabric bonded laminate suitable for use in contact with the human body and for clothing purposes produced by the method of claim 13.

15. The method of claim 1 wherein the carboxylated latex is selected from the group consisting of styrene and butadiene copolymers, diene-nitrile copolymers, diene-acrylate copolymers, diene-vinyl toluene copolymers and diene-vinyl pyridine copolymers.

16. The method of claim 1 wherein the pendant carboxylic groups include acrylate or fumarate groups.

References Cited
UNITED STATES PATENTS

| | | | |
|---|---|---|---|
| 3,158,529 | 11/1964 | Robitcheck et al. | 156—79 X |
| 3,240,655 | 3/1966 | Voelker | 156—79 X |
| 3,305,381 | 2/1967 | Wagener | 156—79 X |
| 3,399,107 | 8/1968 | Biskup et al. | 156—79 X |
| 3,414,458 | 12/1968 | Lacy | 117—76 X |
| 3,513,046 | 5/1970 | Westfield | 161—67 |

GEORGE F. LESMES, Primary Examiner

M. E. McCAMISH, Assistant Examiner

U.S. Cl. X.R.

117—76; 156—79, 331; 161—159, 160, 190, 255; 260—2.5 L

UNITED STATES PATENT OFFICE
CERTIFICATE OF CORRECTION

Patent No. 3,741,854   Dated June 26, 1973

Inventor(s) Frank A. Di Gioia

It is certified that error appears in the above-identified patent and that said Letters Patent are hereby corrected as shown below:

In the title page, first line, amend "De Goria" to read --Di Gioia--.

In column 1, line 4, amend "De Gioia" to read --Di Gioia--.

In column 1, line 5, delete "Dalton, Ga." and insert therefor --Cambridge, Mass.--.

In column 7, claim 7, lines 29-30, amend "heating" to read --bonding--.

In column 7, claim 9, lines 42-43, amend "ingredient" to read --ingredients--.

Signed and sealed this 29th day of January 1974.

(SEAL)
Attest:

EDWARD M. FLETCHER, JR.              RENE D. TEGTMEYER
Attesting Officer                    Acting Commissioner of Patents